United States Patent
Crolley

(10) Patent No.: US 10,366,138 B2
(45) Date of Patent: *Jul. 30, 2019

(54) METHOD AND APPARATUS FOR GENERATING A WEB PAGE

(71) Applicant: AT&T Intellectual Property I, L.P., Atlanta, GA (US)

(72) Inventor: Wayne Crolley, Bryant, AR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,536

(22) Filed: Oct. 12, 2016

(65) Prior Publication Data

US 2017/0032051 A1 Feb. 2, 2017

Related U.S. Application Data

(63) Continuation of application No. 14/567,324, filed on Dec. 11, 2014, now Pat. No. 9,495,458, which is a continuation of application No. 12/608,344, filed on Oct. 29, 2009, now Pat. No. 8,949,248.

(51) Int. Cl.
| | |
|---|---|
| *G06F 16/00* | (2019.01) |
| *G06F 16/957* | (2019.01) |
| *G06F 16/245* | (2019.01) |
| *G06F 16/951* | (2019.01) |
| *G06F 16/955* | (2019.01) |
| *G06F 16/2457* | (2019.01) |
| *G06F 17/22* | (2006.01) |
| *H04L 29/08* | (2006.01) |

(52) U.S. Cl.
CPC ........ *G06F 16/9577* (2019.01); *G06F 16/245* (2019.01); *G06F 16/24578* (2019.01); *G06F 16/951* (2019.01); *G06F 16/955* (2019.01); *G06F 17/2247* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 6,360,221 B1 | 3/2002 | Gough et al. | |
| 7,925,716 B2* | 4/2011 | Zhang ............... | G06F 17/30867 709/218 |
| 2003/0009451 A1* | 1/2003 | Bates ................. | G06F 16/9535 |
| 2005/0096931 A1 | 5/2005 | Baker et al. | |
| 2007/0016609 A1 | 1/2007 | Kim et al. | |
| 2008/0228587 A1* | 9/2008 | Slaney ................. | G06Q 30/02 705/14.71 |
| 2008/0275877 A1* | 11/2008 | Bates ................. | G06F 17/3089 |
| 2009/0063304 A1 | 3/2009 | Meggs | |

(Continued)

*Primary Examiner* — Belix M Ortiz Ditren
(74) *Attorney, Agent, or Firm* — Chiesa Shahinian & Giantomasi PC

(57) ABSTRACT

A method, apparatus and computer readable medium generate a webpage using keywords identified from user input and user email communications. The keywords are identified, ranked, and transmitted to a server where a search engine uses one or more of the keywords to identify items of interest such as articles or videos. A web page is generated using selected items of interest or links to the items of interest which may then be displayed to a user as the user's homepage.

12 Claims, 3 Drawing Sheets

(56) References Cited

U.S. PATENT DOCUMENTS

2009/0198674 A1    8/2009  Custis et al.
2009/0204611 A1*   8/2009  Kamada .............. G06F 16/3334
2009/0254415 A1*  10/2009  Bhavsar ................ G06Q 30/02
                                                        705/14.41

* cited by examiner

METHOD AND APPARATUS FOR GENERATING A WEB PAGE

This application is a continuation of U.S. patent application Ser. No. 14/567,324 filed Dec. 11, 2014, which is a continuation of U.S. patent application Ser. No. 12/608,344 filed Oct. 29, 2009 and issued as U.S. Pat. No. 8,949,248 on Feb. 3, 2015, the disclosures of which are herein incorporated by reference in their entirety.

BACKGROUND

The present disclosure relates generally to information technology, and more particularly to generating a web page based on user interests.

Users often communicate with one another using various methods, such as email, about various items of interest. Users often desire additional information concerning content of email or other communications. Users may separately manually search for additional information concerning items of interest. However, the process of manually searching for items of interest that are discussed in email may be time consuming and inconvenient.

BRIEF SUMMARY

The present disclosure provides a method, apparatus, and computer readable medium for generating a web page based on keywords identified in user input and user communications. In one embodiment, keywords automatically identified and ranked at a user device are received at a server. Items of interest based on the keywords are identified and a web page is generated including at least one item of interest. The keywords may be identified from user input and user email communications using an intercept agent.

In another embodiment, keywords are identified and ranked at a user device and then transmitted to a server. The user device receives a web page from the server including at least one item of interest identified based on at least one of the keywords. The keywords may be identified from user input to the user device and from user email communications. The web page can be presented to a user in response to a user input. In one embodiment, the webpage can be presented to the user as the user's homepage.

These and other advantages of the disclosure will be apparent to those of ordinary skill in the art by reference to the following detailed description and the accompanying drawings.

DETAILED DESCRIPTION

Figure 1:
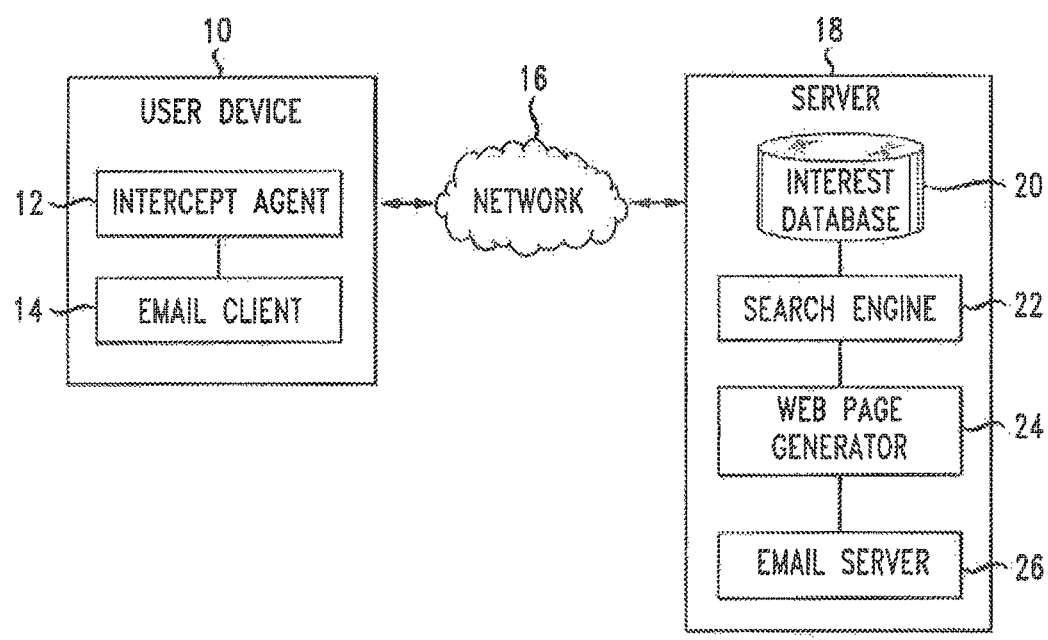
FIG. 1 shows a user device in communication with a server via a network according to one embodiment of the present disclosure.

FIG. 1 shows user device 10 in communication with server 18 via network 16. User device 10 in one embodiment is a portable handheld communication device such as a cell phone or Blackberry configured to communicate via a network, such as wireless network 16. User device 10, in other embodiments, may be other devices configured to facilitate communication such as a desktop computer, laptop computer, cell phone, etc.

Intercept agent 12, in one embodiment, is a module which resides on user device 10. Intercept agent 12 is configured to monitor a user's communications, such as email communications facilitated by email client 14, which in one embodiment, may be implemented as a standard email client such as Microsoft Outlook or Mozilla Thunderbird. Intercept agent 12, in one embodiment, includes a user input capture module which monitors what a user inputs to user device 10 via user inputs (e.g. keyboard, touch screen, buttons, etc.). In one embodiment, the user input capture module is a keystroke logger. User device 10 is in communication with other devices, such as server 18, via network 16.

Network 16 of FIG. 1, in one embodiment, is a wireless network but may be a different type of network, such as a wired network, or a combination of wired and wireless connections and/or networks. Network 16, in one embodiment, is a large network such as the Internet, and facilitates communication between devices such as user device 10 and server 18.

Server 18 includes interest database 20 configured, in one embodiment, to store keywords identified by intercept agent 12 and transmitted from user device 10. Server 18 also includes search engine 22 configured to communicate with database 20 and search the Internet for matches to selected words such as the keywords stored in interest database 20 in order to identify items of interest based on the keywords. Web page generator 24 is in communication with interest database 20 and search engine 22. In one embodiment, web page generator 24 generates a web page for a particular user based on the items of interest identified by search engine 22 based on keywords contained in interest database 20 related to a particular user. It should be noted that items of interest may be one of text, video, audio, and images. In one embodiment, the web page generated by web page generator 24 may include one or more of text, video, audio, and images and/or links to items of interest all of which may be displayed on a web page in various configurations (e.g., thumbnails of images and a still frame of a video). In one embodiment, the generated web page is a user's home page. Server 18 is depicted in FIG. 1 including email server 26 which facilitates the transmission and receipt of user emails. In one embodiment, one or more of interest database 20, search engine 22, and web page generator 24 may be located on user device 10.

Figure 2:
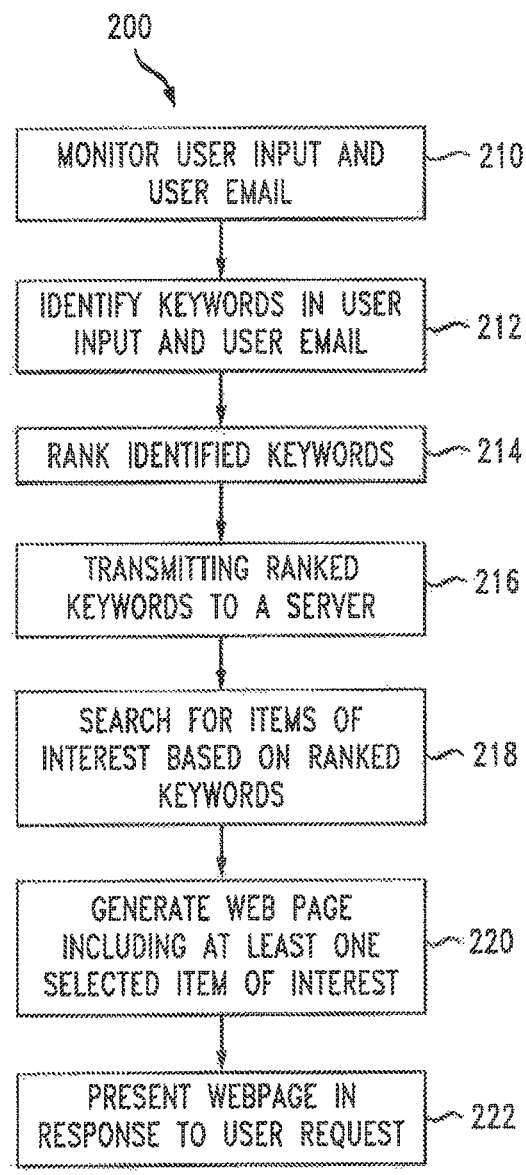
FIG. 2 is a flowchart showing a method of automatically generating a webpage according to one embodiment of the present disclosure.

FIG. 2 depicts a method according to one embodiment of the present disclosure which will now be described in conjunction with FIG. 1.

At step 210 of flowchart 200, intercept agent 12 monitors user input and user email. Intercept agent 12, in one embodiment, uses a keystroke logger to acquire user input and accesses email client 14 to monitor user email. At step 212, intercept agent 212 identifies keywords contained in user input and user email. For example, in one embodiment, at step 212, words such as nouns and verbs are identified as keywords contained in user input and emails while other words, such as conjunctions, are not identified as keywords. At step 214 the keywords are ranked.

In one embodiment, the keywords are ranked according to occurrence in user input and emails. In other embodiments, other methods of ranking are used to identify keywords based on occurrence and/or additional factors.

At step 216, the ranked keywords are transmitted via network 16 to server 18 where they are stored in interest database 20. At step 218, search engine 22 accesses ranked keywords stored in database 20 and searches a network, such as the Internet, for items of interest based on the ranked keywords. An item of interest is information related to one or more keywords generated by the search of the network. An item of interest is information such as an article, webpage, image, video clip, or audio clip and may be in one or more mediums such as text, image, video, and audio.

In one embodiment, the one or more ranked keywords stored in database 20 may be used separately or in combination by search engine 22 to find items of interest. In one embodiment, the ranking of keywords stored in database 20 can be changed by a user accessing database 20 via network 16 using user device 10. In one embodiment, a user can modify the ranking of keywords, add additional keywords, or eliminate keywords.

At step 220, web page generator 24 generates a webpage including items of interest determined in step 218. Items of interest to be displayed on the generated website may be the actual information determined to be an item of interest or a link to the information (i.e., the generated website may be configured to display the information or a link to the information.) In addition, a web page configured to display items of interest may include a portion of the information in addition to displaying a link to the information. For example, if the information is text, a portion or the text may be presented in conjunction with the link to the information. If the information is a video, one or more images contained in the video may be presented in conjunction with the link to the information. If the information is an image, a thumbnail of the image may be presented.

In one embodiment, the items of interest to be displayed on the generated webpage may be selected based on other user input in addition to the ranked keywords. Information obtained during the initialization of intercept agent 12 may used in conjunction with ranked keywords to select items of interest identified by search engine 22. In one embodiment, during initialization of intercept agent 12, a user is prompted to enter user information such as the user's employer, the user's role or position, the user's preferred or current geographic location, etc. This information may then be used to select items of interest generated by search engine 22. In another embodiment, user information is used by search engine 22 to search for items of interest on a network such as the Internet. In yet another embodiment, ranked keywords and/or user input may be time/date stamped in order to determine items of interest based on when keywords were identified and/or user input was received. This allows items of interest to be determined based on additional time information which may be used to present newer items of interest generated based on later keywords and user input. In one embodiment, a user may specify how long keywords and/or user input should be used in generating items of interest before being deleted or ranked lower.

At step 222, the web page generated for the user associated with user device 10 is transmitted by server 18 via network 16 to user device 10 in response to a request from the user associated with user device 10. The generated webpage is then presented to the user via the user device. In one embodiment, the transmitted webpage is the user's home page and is transmitted in response to the user initiating a web browser such as Microsoft Internet Explorer or Mozilla Firefox.

In one embodiment, articles determined to be items of interest may be read to a user via the user device using a text to speech converter. In addition, videos identified as items of interest may be transmitted to another device, such as a home entertainment system, for later viewing.

It should be noted that although FIG. 1 depicts server 18 including interest database 20, search engine 22, webpage generator 24 and email server 26, in other embodiments, these components may be implemented on hardware separate from and in communication with server 18. Similarly, user device 10 is depicted including intercept agent 12 and email client 14 which, alternatively, in another embodiment, may be implemented on hardware separate from and in communication with user device 10.

Figure 3:
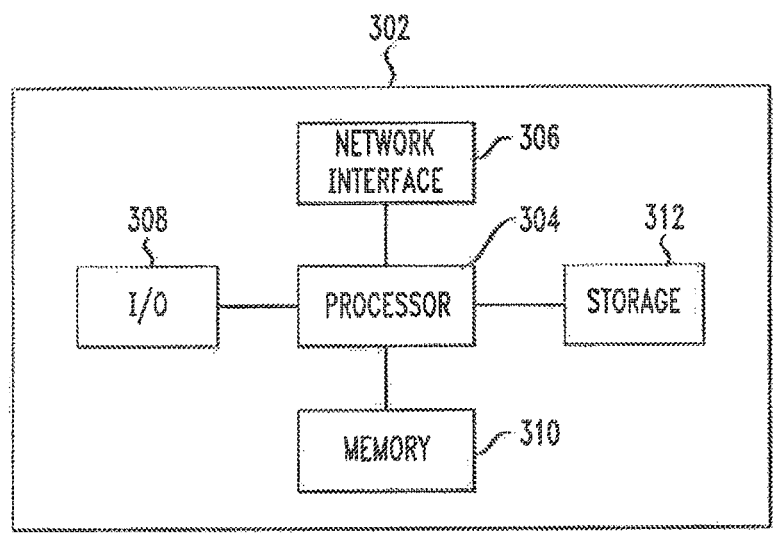
FIG. 3 is a high-level block diagram of a computer that may be used to implement the devices of FIG. 1.

User device 10 and server 18 may each be implemented using a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded into memory 310 when execution of the computer program instructions is desired. Thus, the method steps of FIG. 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method comprising:
    receiving a plurality of keywords, each of the plurality of keywords based on user input and user communications associated with a particular user, each of the plurality of keywords associated with a respective ranking based on a number of times a respective keyword occurred in the user input and the user communications, wherein each ranking is generated by an intercept module located on a user device;
    reducing a ranking associated with one of the plurality of keywords based on expiration of a period of time defined by the particular user that begins on a date and a time identified by a date and time stamp associated with the one of the plurality of keywords;

identifying items of interest based on the plurality of keywords and associated rankings; and generating a webpage based on the items of interest.

2. The method of claim 1, wherein the intercept module uses a keystroke logger to acquire the user input and accesses an email client to obtain user communications.

3. The method of claim 1, wherein the keywords are generated based on content of user email communications.

4. The method of claim 1, wherein the items of interest comprise one of an article, a webpage, an image, a video clip, and an audio clip.

5. An apparatus comprising:

a processor; and a memory to store computer program instructions, the computer program instructions when executed by the processor cause the processor to perform operations comprising:

receiving a plurality of keywords, each of the plurality of keywords based on user input and user communications associated with a particular user, each of the plurality of keywords associated with a respective ranking based on a number of times a respective keyword occurred in the user input and the user communications, wherein each ranking is generated by an intercept module located on a user device;

reducing a ranking associated with one of the plurality of keywords based on expiration of a period of time defined by the particular user that begins on a date and a time identified by a date and time stamp associated with the one of the plurality of keywords;

identifying items of interest based on the plurality of keywords and associated rankings; and generating a webpage based on the items of interest.

6. The apparatus of claim 5, wherein the intercept module uses a keystroke logger to acquire the user input and accesses an email client to obtain user communications.

7. The apparatus of claim 5, wherein the keywords are generated based on content of user email communications.

8. The apparatus of claim 5, wherein the items of interest comprise one of an article, a webpage, an image, a video clip, and an audio clip.

9. A computer readable medium storing computer program instructions, which, when executed by a processor, cause the processor to perform operations comprising:

receiving a plurality of keywords, each of the plurality of keywords based on user input and user communications associated with a particular user, each of the plurality of keywords associated with a respective ranking based on a number of times a respective keyword occurred in the user input and the user communications, wherein each ranking is generated by an intercept module located on a user device;

reducing a ranking associated with one of the plurality of keywords based on expiration of a period of time defined by the particular user that begins on a date and a time identified by a date and time stamp associated with the one of the plurality of keywords;

identifying items of interest based on the plurality of keywords and associated rankings; and generating a webpage based on the items of interest.

10. The computer readable medium of claim 9, wherein the intercept module uses a keystroke logger to acquire the user input and accesses an email client to obtain user communications.

11. The computer readable medium of claim 9, wherein the keywords are generated based on content of user email communications.

12. The computer readable medium of claim 9, wherein the items of interest comprise one of an article, a webpage, an image, a video clip, and an audio clip.

* * * * *